No. 766,125. PATENTED JULY 26, 1904.
L. N. D. WILLIAMS.
ANNULUS.
APPLICATION FILED AUG. 21, 1903.
NO MODEL. 2 SHEETS—SHEET 1.

Witnesses:
Frank L. A. Graham
Herman E. Metius

Inventor:
Louis N. D. Williams,
by his Attorneys:

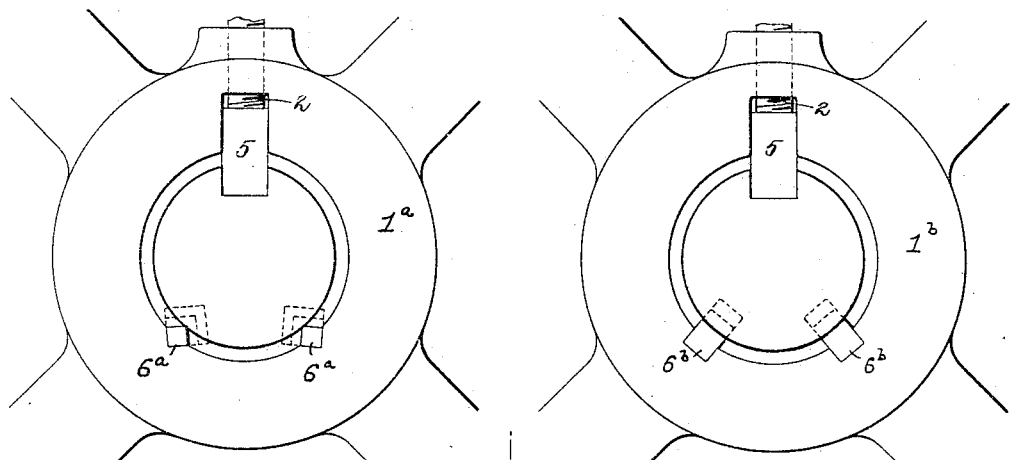
Fig. 4.   Fig. 5.
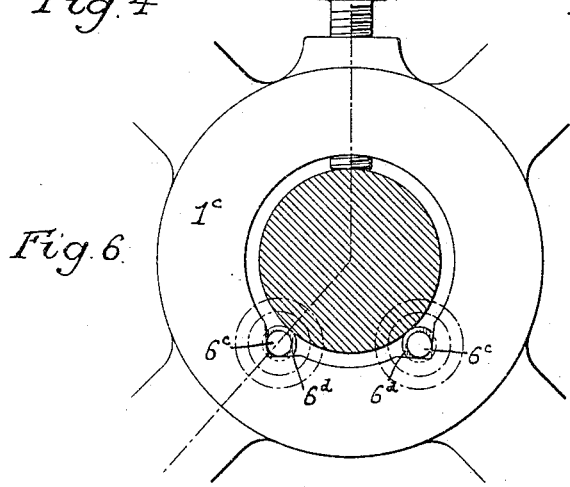
Fig. 6.
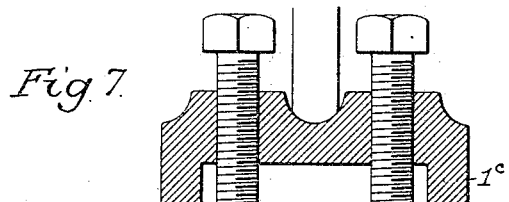
Fig. 7.
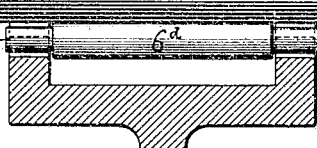

No. 766,125. Patented July 26, 1904.

UNITED STATES PATENT OFFICE.

LOUIS N. D. WILLIAMS, OF OGONTZ, PENNSYLVANIA, ASSIGNOR OF ONE-HALF TO ROBERT W. SCOTT, OF PHILADELPHIA, PENNSYLVANIA.

ANNULUS.

SPECIFICATION forming part of Letters Patent No. 766,125, dated July 26, 1904.

Application filed August 21, 1903. Serial No. 170,274. (No model.)

*To all whom it may concern:*

Be it known that I, LOUIS N. D. WILLIAMS, a citizen of the United States, and a resident of Ogontz, Montgomery county, Pennsylvania, have invented a certain Improved Annulus, of which the following is a specification.

My present invention consists of a special form of the annulus constituting the subject of my application for patent filed July 24, 1903, Serial No. 166,879, the purpose of the present form of said invention being to adapt the hub of a wheel or pulley or the sleeve of a coupling for ready application to shafts of different diameters by interposing between shafts of the smaller diameters and fixed bearings in the annulus shaft-supporting blocks seated upon said fixed bearings and of such size as to bring the fixed bearings for the shaft as much closer to the axis of the annulus as is required by the reduced diameter of the shaft.

Figure 1:
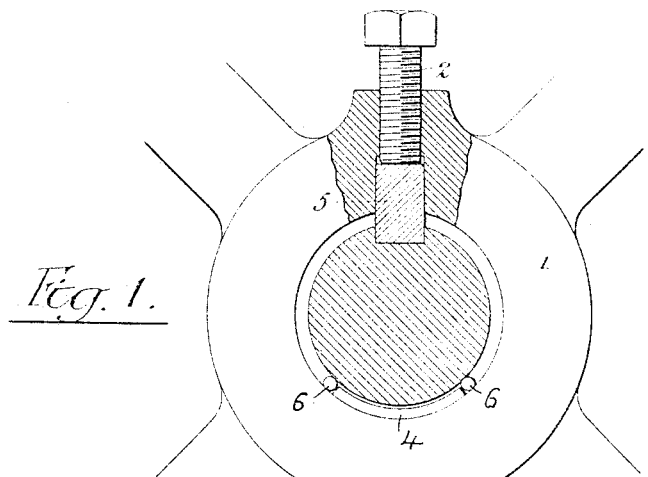
Figure 2:
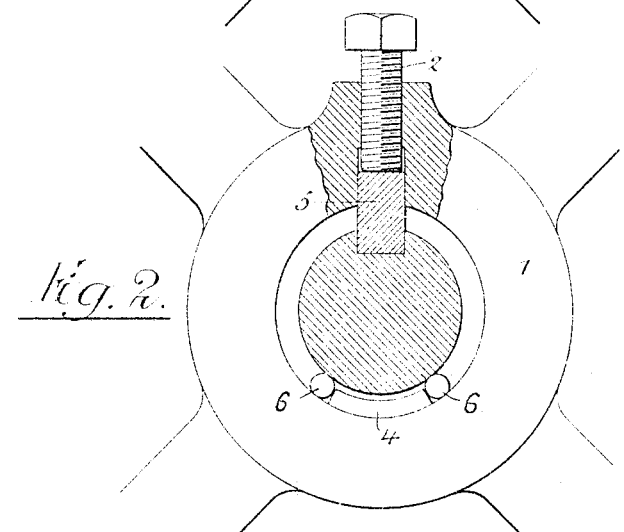
Figure 3:
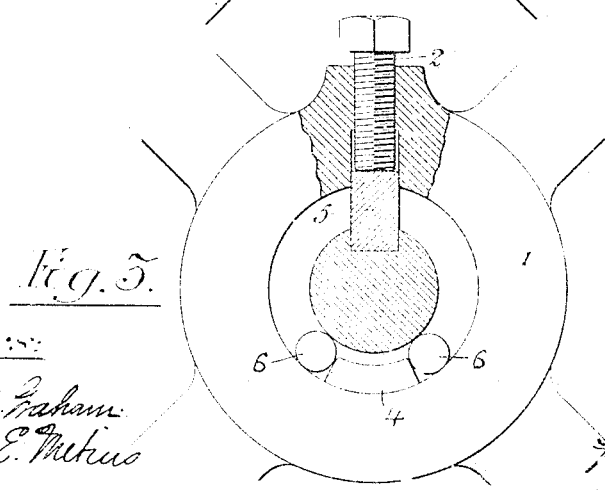

In the accompanying drawings, Figure 1 is a view, partly in end elevation and partly in section, of the hub portion of a wheel or pulley constructed in accordance with my invention, showing the same applied to a shaft of maximum diameter. Fig. 2 is a view similar to Fig. 1, but illustrating the application of the pulley to a shaft of smaller diameter than that shown in Fig. 1. Fig. 3 is a like view illustrating the application of the pulley to a shaft of still smaller diameter. Figs. 4 and 5 are end views of hubs having rectangular supporting-blocks in place of the cylindrical supporting-blocks, as shown in Figs. 1, 2, and 3; and Figs. 6 and 7 are respectively an end view and a longitudinal section illustrating the application of my invention to a recessed or chambered hub.

The purpose of the former invention was to so construct an annulus that the same would run true with the shaft or would hold the shaft true in its bearing even though the bore of the annulus was larger than the diameter of the shaft, so that the annulus could be readily placed upon or removed from the shaft; and my present invention has the same general object and in addition thereto the special object of providing wheels or pulleys capable of application to any one of a number of shafts whose diameter may vary within a relatively wide range, whereby the special boring of a hub to fit a shaft of a given size is rendered unnecessary and wheels or pulleys of various diameters and various widths of face may be kept in stock without requiring such an inordinately large number as would be necessary if each pulley was adapted only to a shaft of a particular size.

In the drawings, 1 represents the hub of the wheel or pulley, or it may represent the sleeve of a shaft-coupling or other form of annulus. For convenience, however, I will refer to it as a "pulley-hub." On one side of the bore of the hub is a threaded opening for the reception of a screw 2, which may bear directly upon the shaft to which the pulley is applied, but which by preference bears upon a radially-sliding key 5, which is adapted to a key-seat formed in said shaft, this key projecting into a recess in the hub 1 and being of any desired length, the screws 2 being increased in number, if desired, so as to act upon the key at different points in its length. The bore of the hub is slightly greater than the diameter of the largest shaft for which the wheel or pulley is intended. For instance, if said largest shaft is two inches in diameter the bore of the hub may be about two and one-eighth inches.

In the bore of the hub on the side opposite that which carries the set-screw 2 are a pair of shaft-supporting blocks 6, which are laterally separated to any desired extent within one-half of the circumference of the bore and are prevented from approaching each other by any suitable means—as, for instance, by projections in the bore or by an interposed separator 4, consisting of a segmental or other bar of the desired length, the supporting-blocks shown in Figs. 1, 2, and 3 consisting of short sections of rolled rod or other true cylinders.

In preparing the hub the same may be bored throughout or only trued in those parts which are to form seats for the blocks 6. A hub prepared in this way and provided with supporting-blocks of any desired diameter can be secured upon a mandrel, and the face of the pulley can then be turned or otherwise trued and the ends of the hub faced, if necessary, so that when the hub is applied to a shaft the pulley will run with equal truth thereon whether said shaft is of the same or of lesser or greater diameter than the mandrel, the diameter of the blocks 6 being regulated to accord with the diameter of the shaft and the latter being in all cases supported in a position concentric with the rim of the wheel or pulley.

As the shaft-supporting blocks always have their bearing upon a surface concentric with the axis of the pulley and as the distance of this surface from the periphery of the shaft of maximum diameter is known, no calculation will be required to determine the proper diameter of blocks required in any particular case. For instance, if the periphery of the shaft of maximum diameter is one-eighth of an inch from the support for the blocks a reduction in the diameter of the shaft to the extent of one-half inch would necessitate the use of shaft-supporting blocks three-eighths of an inch in diameter, and so on.

The key 5 may be of sufficient width to accommodate the different sizes of shafts as shown, or a special width of key may be employed in connection with each shaft.

Supposing that the hub has immovable and separated seats whose bases are at a fixed distance from the axis of the hub, various forms of shaft-supporting blocks other than the cylindrical blocks shown in Figs. 1, 2, and 3 may be used. For instance, in Fig. 4 I have shown a hub 1$^a$ with V-shaped recesses therein, to which are adapted blocks 6$^a$, square in cross-section, the inner corners of which blocks serve as supports for the shaft, the blocks being increased in size, as shown by dotted lines, as the shafts decrease in diameter, and in Fig. 5 I have shown a hub 1$^b$ with rectangular recesses therein for the reception of rectangular blocks 6$^b$, decrease in diameter of the shaft in this case being compensated for by an increase in the width of the blocks.

In that embodiment of my invention shown in Figs. 6 and 7 the hub 1$^c$ has flanged ends in which are recesses for the reception of the journals 6$^e$ of rollers 6$^d$, which serve as the supports for the shaft, the diameter of the bodies of the rollers being such as required by the diameter of the shaft, but the diameters of the journals being always the same, so that the recessed flanges of the hub provide unchanging seats therefor. As this construction would, however, impose excessive strain upon the journals of the rollers, the other embodiments of my invention are preferred.

In all cases the two immovable and separated points of contact for the shaft should be disposed within one-half of the circumference of said shaft, so that when pressure is applied to the other side of the shaft such pressure will cause the shaft to properly seat itself upon said immovable and separated bearings.

Having thus described my invention, I claim and desire to secure by Letters Patent—

1. An annulus for shafts having a bore of sufficiently greater diameter than the shaft to which it is to be applied to permit the annulus to be readily slipped over the shaft, and having, within less than one-half of the circumference of its bore, two immovable and separated seats, shaft-supporting blocks interposed between said seats and the shaft, and adjustable means on the opposite side of the bore for imparting pressure to the shaft, so as to cause the latter to seat itself upon said supporting-blocks, substantially as specified.

2. An annulus for shafts having a bore of sufficiently greater diameter than the shaft to which it is to be applied to permit the annulus to be readily slipped over the shaft, and having within less than one-half of the circumference of its bore, two immovable and separated seats, shaft-supporting blocks interposed between said seats and the shaft, means for maintaining the proper separation of said blocks, and adjustable means on the opposite side of the bore for imparting pressure to the shaft, so as to cause the latter to seat itself upon said supporting-blocks, substantially as specified.

3. An annulus for shafts having a bore of sufficiently greater diameter than the shaft to which it is to be applied to permit the annulus to be readily slipped over the shaft, and having, within less than one-half of the circumference of its bore, two immovable and separated seats consisting of recesses adapted for the reception of blocks which will provide seats for a shaft of smaller diameter than the maximum, and adjustable means on the opposite side of the bore for imparting pressure to the shaft, so as to cause the latter to seat itself upon such blocks, substantially as specified.

4. An annulus for shafts having a bore of sufficiently greater diameter than the shaft to which it is to be applied to permit the annulus to be readily slipped over the shaft, and having within less than one-half of the circumference of its bore, two immovable and separated seats concentric with the axis of the annulus, shaft-supporting blocks interposed between said seats and the shaft, and adjustable means on the opposite side of the bore for imparting pressure to the shaft so as to cause the latter to seat itself upon said supporting-blocks, substantially as specified.

5. An annulus for shafts having a bore of sufficiently greater diameter than the shaft to which it is to be applied to permit the annulus to be readily slipped over the shaft, and having, within less than one-half of the circumference of its bore, two immovable and separated seats concentric with the axis of the annulus, shaft-supporting blocks interposed between said seats and the shaft, means for maintaining the proper separation of said blocks, and adjustable means on the opposite side of the bore for imparting pressure to the shaft so as to cause the latter to seat itself upon said supporting-blocks, substantially as specified.

6. An annulus for shafts having a bore of sufficiently greater diameter than the shaft to which it is to be applied to permit the annulus to be readily slipped over the shaft, and having, within less than one-half of the circumference of its bore, two immovable and separated seats for the shaft, and on the opposite side of the said bore, a radially-adjustable key adapted to a key-seat in the shaft, and means for imparting pressure to said key so as to cause the shaft to bear upon said fixed and separated seats, substantially as specified.

7. An annulus for shafts having a bore of sufficiently greater diameter than the shaft to which it is to be applied to permit the annulus to be readily slipped over the shaft, and having, within less than one-half of the circumference of its bore, two immovable and separated seats consisting of recesses adapted for the reception of blocks to be interposed between the shaft and the annulus, and having, on the opposite side of the bore, a radially-adjustable key adapted to a key-seat in the shaft, and adjustable means for imparting pressure to said key whereby it causes the shaft to bear upon the said blocks irrespective of the diameter of the shaft, substantially as specified.

In testimony whereof I have signed my name to this specification in the presence of two subscribing witnesses.

LOUIS N. D. WILLIAMS.

Witnesses:
F. E. BECHTOLD,
JOS. H. KLEIN.